United States Patent
Kitagawa et al.

(10) Patent No.: US 9,962,683 B2
(45) Date of Patent: May 8, 2018

(54) ALLOY MICROPARTICLES AND METHOD FOR PRODUCING SAME, ALLOY MICROPARTICLE CLUSTER, CATALYST, AND METHOD FOR PRODUCING SAME

(71) Applicants: Kyoto University, Kyoto-shi, Kyoto (JP); OITA UNIVERSITY, Oita-shi, Oita (JP); KYUSHU UNIVERSITY, NATIONAL UNIVERSITY CORPORATION, Fukuoka-shi, Fukuoka (JP)

(72) Inventors: Hiroshi Kitagawa, Kyoto (JP); Kohei Kusada, Kyoto (JP); Hirokazu Kobayashi, Kyoto (JP); Katsutoshi Nagaoka, Oita (JP); Katsutoshi Sato, Oita (JP); Syo Matsumura, Fukuoka (JP); Tomokazu Yamamoto, Fukuoka (JP)

(73) Assignees: Kyoto University, Kyoto (JP); OITA UNIVERSITY, Oita (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 0 days. days.

(21) Appl. No.: 15/510,095

(22) PCT Filed: Sep. 9, 2015

(86) PCT No.: PCT/JP2015/075547
§ 371 (c)(1),
(2) Date: Mar. 9, 2017

(87) PCT Pub. No.: WO2016/039361
PCT Pub. Date: Mar. 17, 2016

(65) Prior Publication Data
US 2017/0259247 A1    Sep. 14, 2017

(30) Foreign Application Priority Data

Sep. 9, 2014   (JP) ................................ 2014-183329

(51) Int. Cl.
*B01J 23/44*    (2006.01)
*B01J 23/46*    (2006.01)
(Continued)

(52) U.S. Cl.
CPC ............. *B01J 23/462* (2013.01); *B01J 37/16* (2013.01); *B22F 9/24* (2013.01); *C22C 1/0466* (2013.01);
(Continued)

(58) Field of Classification Search
CPC .......... B01J 23/44; B01J 23/462; B01J 37/16; C22C 1/0466; C22C 5/04; B22F 9/24
See application file for complete search history.

(56) References Cited

U.S. PATENT DOCUMENTS 3,962,139 A * 6/1976 van de Moesdijk ..... B01J 23/62
502/215
8,071,503 B2 * 12/2011 Fisher ................... H01M 4/921
204/284
(Continued)

FOREIGN PATENT DOCUMENTS

JP    2005-240099 A    9/2005
JP    2010-150568 A    7/2010
(Continued)

OTHER PUBLICATIONS

Japanese Patent Offce, International Search Report in International Patent Application No. PCT/JP2015/075547 (dated Dec. 15, 2015).
(Continued)

*Primary Examiner* — Cam N. Nguyen
(74) *Attorney, Agent, or Firm* — Leydig, Voit & Mayer, Ltd.

(57) ABSTRACT

The present invention provides an alloy fine particle including palladium and ruthenium, the alloy fine particle includ- (Continued)

ing at least one first phase in which the palladium is more abundant than the ruthenium and at least one second phase in which the ruthenium is more abundant than the palladium, the at least one first phase and the at least one second phase being separated by a phase boundary, the palladium and the ruthenium being distributed in the phase boundary in such a manner that the molar ratio of the palladium and the ruthenium continually changes, a plurality of crystalline structures being present together in the phase boundary.

20 Claims, 10 Drawing Sheets

(51) Int. Cl.
  *B01J 37/16* (2006.01)
  *C22C 1/04* (2006.01)
  *C22C 5/04* (2006.01)
  *B22F 9/24* (2006.01)
  *F01N 3/28* (2006.01)
(52) U.S. Cl.
  CPC .................. *C22C 5/04* (2013.01); *F01N 3/28* (2013.01); *B22F 2009/245* (2013.01); *B22F 2301/25* (2013.01); *B22F 2998/10* (2013.01)

(56) References Cited

U.S. PATENT DOCUMENTS

| | | | | |
|---|---|---|---|---|
| 8,119,205 B2* | 2/2012 | Roa | ..................... | H01M 8/0668 427/383.1 |
| 8,361,924 B2* | 1/2013 | Tanaka | ..................... | B01J 21/18 429/400 |
| 9,273,378 B2 | 3/2016 | Kitagawa et al. | | |
| 9,452,417 B2 | 9/2016 | Kitagawa et al. | | |
| 9,540,712 B2 | 1/2017 | Kitagawa et al. | | |
| 2001/0026782 A1* | 10/2001 | Wang | ..................... | B01J 12/007 422/211 |
| 2006/0027042 A1* | 2/2006 | Sato | ..................... | B01J 23/89 75/255 |
| 2006/0032330 A1* | 2/2006 | Sato | ..................... | B22F 1/0018 75/371 |
| 2008/0318765 A1* | 12/2008 | Aradi | ..................... | B01D 53/945 502/87 |
| 2012/0094140 A1 | 4/2012 | Kitagawa et al. | | |
| 2015/0231605 A1 | 8/2015 | Kitagawa et al. | | |
| 2015/0231697 A1 | 8/2015 | Kitagawa et al. | | |

FOREIGN PATENT DOCUMENTS

| | | |
|---|---|---|
| JP | 2011-089143 A | 5/2011 |
| WO | WO 2010/122811 A1 | 10/2010 |
| WO | WO 2014/045570 A1 | 3/2014 |

OTHER PUBLICATIONS

Kusada et al., "Solid Solution Alloy Nanoparticles of Immiscible Pd and Ru Elements Neighboring on Rh: Changeover of the Thermodynamic Behavior for Hydrogen Storage and Enhanced CO-Oxidizing Ability," *J. Am. Chem. Soc.*, 136(5): 1864-1871 (2014).
European Patent Office, Extended European Search Report in European Patent Application No. 15839679.6 (dated Mar. 8, 2018).

* cited by examiner

ALLOY MICROPARTICLES AND METHOD FOR PRODUCING SAME, ALLOY MICROPARTICLE CLUSTER, CATALYST, AND METHOD FOR PRODUCING SAME

CROSS-REFERENCE TO RELATED APPLICATIONS

This patent application is the U.S. national phase of International Patent Application No. PCT/JP2015/075547, filed Sep. 9, 2015, which claims the benefit of Japanese Patent Application No. 2014-183329, filed on Sep. 9, 2014, which are incorporated by reference in their entireties herein.

TECHNICAL FIELD

The present invention relates to an alloy fine particle, a method for producing the alloy fine particle, an alloy fine particle cluster, a catalyst, and a method for producing the catalyst.

BACKGROUND ART

Palladium (Pd) is one of the rare metals, and its fine particles are used in catalysts for various reactions, such as catalysts for automobile exhaust-gas purification (three-way catalysts) in industrial applications and electrode catalysts for domestic fuel cells in ENE-FARM systems. However, fine particles of palladium used in these catalysts are poisoned by CO (carbon monoxide) generated during various chemical reactions, which makes it difficult to use the particles at high power for a long period of time. Thus, there have been many studies on techniques to reduce the degradation of catalysts due to such poisoning. Ruthenium (Ru), one of the platinum group metals, is durable against CO poisoning because of its catalytic activity to oxidize CO to $CO_2$ (carbon dioxide), and has been used in the form of an alloy with other metals, such as platinum, in electrodes of fuel cells in order to reduce CO poisoning. However, palladium and ruthenium are mutually immiscible in equilibrium at the atomic level (i.e., they cannot form a solid solution), and they are separated from each other. A combination of two metals, Rh and Ag or Rh and Au, is also immiscible at the atomic level.

Patent Literature 1 discloses the use of homogeneous Pd—Ru solid-solution-alloy fine particles as a catalyst. Patent Literature 2 discloses alloy fine particles in which silver and rhodium or gold and rhodium are present in the form of a solid solution. However, these two types of metal solid solutions are thermally unstable, causing concern over durability at high temperatures.

The nanoparticles disclosed in Patent Literature 3 are those of metal sulfide.

Patent Literature 4 teaches that mixing a plurality of metal nanoparticles and subjecting the mixed nanoparticles to heat treatment provides particles in each of which the mixed metal nanoparticles are bonded.

CITATION LIST

Patent Literature

Patent Literature 1: WO2014/045570
Patent Literature 2: WO2010/122811
Patent Literature 3: JP2005-240099A
Patent Literature 4: JP2010-150568A

SUMMARY OF INVENTION

Technical Problem

An object of the present invention is to provide a novel alloy fine particle excellent in heat resistance, a method for producing the particle, an alloy fine particle cluster, a catalyst, and a method for producing the catalyst.

Solution to Problem

The present invention has developed alloy fine particles that are thermally more stable by preparing a solid-solution alloy containing Pd and Ru, and subjecting the alloy to heat treatment to facilitate the structural change of the alloy. The present invention provides an alloy fine particle and a method for producing the particle, an alloy fine particle cluster and a catalyst, in particular, a three-way catalyst for exhaust gas purification, and a method for producing the catalyst as described below.

Item 1.

An alloy fine particle comprising palladium and ruthenium, the alloy fine particle comprising at least one first phase in which the palladium is more abundant than the ruthenium and at least one second phase in which the ruthenium is more abundant than the palladium, the at least one first phase and the at least one second phase being separated by a phase boundary, the palladium and the ruthenium being distributed in the phase boundary in such a manner that the molar ratio of the palladium and the ruthenium continually changes, and a plurality of crystalline structures being present together in the phase boundary.

Item 2.

The alloy fine particle according to Item 1, wherein the at least one first phase and/or the at least one second phase comprise a plurality of crystal grains of a face-centered cubic structure (fcc) or a hexagonal close-packed structure (hcp), and wherein the molar ratio of the palladium to the ruthenium varies between the the face-centered cubic structures (fcc) or the hexagonal close-packed structures (hcp).

Item 3.

The alloy fine particle according to Item 1, wherein the molar ratio of the palladium to the ruthenium present in the at least one first phase is 99:1 to 50.1:49.9, and the molar ratio of the palladium to the ruthenium present in the at least one second phase is 1:99 to 49.9:50.1.

Item 4.

The alloy fine particle according to Item 3, wherein the molar ratio of the palladium to the ruthenium present in the at least one first phase is 95:5 to 55:45, and the molar ratio of the palladium to the ruthenium present in the at least one second phase is 5:95 to 45:55.

Item 5.

The alloy fine particle according to Item 1, wherein the molar ratio of the palladium to the ruthenium present in the entire alloy fine particle is 10:90 to 90:10.

Item 6.

An alloy fine particle cluster comprising a plurality of alloy fine particles, the plurality of alloy fine particles each being the alloy fine particle according to any one of Items 1 to 5, wherein the difference (variations) in molar ratio of the palladium to the ruthenium present in the entire alloy fine particle is up to 5 mol % in all of the alloy fine particles.

Item 7.

The alloy fine particle cluster according to Item 6, wherein the difference in molar ratio of the palladium to the ruthenium present in the entire alloy fine particle is up to 3 mol % in all of the alloy fine particles.

Item 8.

The alloy fine particle cluster according to Item 6, wherein the difference in molar ratio of the palladium to the ruthenium present in the entire alloy fine particle is up to 1 mol % in all of the alloy fine particles.

Item 9.

A catalyst for purifying exhaust gas comprising the alloy fine particle according to any one of Items 1 to 5 and a carrier, wherein the alloy fine particle is supported on the carrier.

Item 10.

A method for producing the alloy fine particle according to any one of Items 1 to 5, the method comprising heating an aqueous solution containing a palladium salt and a ruthenium salt in the presence of a reducing agent to obtain a solid-solution alloy fine particle containing palladium and ruthenium, and heating the particle to a temperature of 650° C. or more.

Item 11.

A method for producing a catalyst for purifying exhaust gas, the catalyst comprising the alloy fine particle containing palladium and ruthenium according to any one of claims 1 to 5 supported on a carrier, the method comprising heating an aqueous solution containing a palladium salt and a ruthenium salt in the presence of a reducing agent and a carrier to support a solid-solution alloy fine particle containing palladium and ruthenium on the carrier, and heating the particle to a temperature of 650° C. or more.

Advantageous Effects of Invention

Metal fine particles containing Pd and Ru are useful catalysts that can be used in various reactions. The present invention shows promise for the development of catalysts that have higher activity than ever before.

The alloy fine particles according to the present invention each contain multiple alloy phases (the first phase and the second phase), and Pd and Ru remain present at multiple different molar ratios between the phases in the single alloy fine particle, even when the particles are used at high temperatures. In addition, the molar ratios of Pd to Ru include molar ratio(s) that are far beyond the solid-solubility limit in the binary alloy phase diagram of Pd and Ru, and the state is maintained. Thus, the particles are useful as a catalyst that exhibits excellent heat resistance with the catalytic properties being maintained.

The alloy fine particle cluster according to the present invention has significantly small variations in the content of Pd and Ru (mol %) across alloy fine particles, thus achieving stability.

BRIEF DESCRIPTION OF DRAWINGS

FIG. 7(a) shows an HAADF-STEM image. FIG. 7(b) shows a STEM-EDS image made by superimposing a Pd image and Ru image on one another (elemental mapping). FIG. 7(c) shows a magnified view of the portion indicated as (c) in FIG. 7(a). FIG. 7(d) shows a magnified view of the portion indicated as (d) in FIG. 7(c); hcp (the second phase) and fcc (the first phase) are separated by two white lines (1) (phase boundaries); and two hcp regions with different Pd/Ru compositions and different directions are separated by a white line (2), but the white line (2) is not a phase boundary. FIG. 7(e) shows a result of line analysis in which two second phases (hcp) differ in Pd/Ru ratio. FIG. 7(f) shows model structures of hcp and fcc by an fcc [110] plane and an hcp [100] plane.

DESCRIPTION OF EMBODIMENTS

Figure 1:
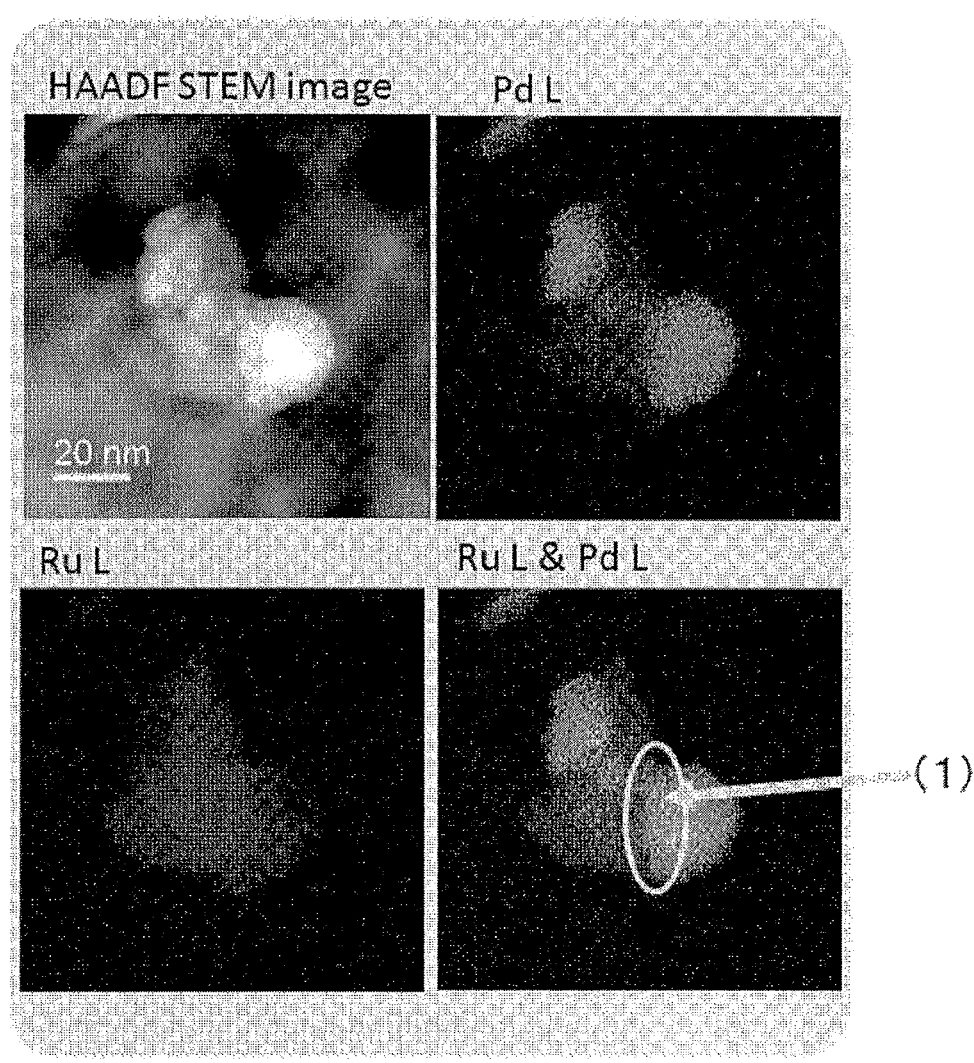
FIG. 1 shows the distribution of each metal in an alloy fine particle ($Pd_5Ru_5$) of the present invention in STEM-EDS analysis. The Pd L is a mapping image of the distribution of Pd shown in green and brightness, expressed by characteristic X-rays emitted from electrons in the Pd L shell. The Ru L is a mapping image of the distribution of Ru shown in red and brightness, expressed by characteristic X-rays emitted from electrons in the Ru L shell. The Ru L & Pd L is a superimposed image of the Pd L mapping image and the Ru L mapping image. The part indicated by (1) is a phase boundary.

The alloy fine particle according to the present invention contain, as the primary component, Pd and Ru, which are two different metals and which do not form a solid solution. The particle may consist of only these two types of metals, or may further contain one or more other metals in addition to these two metals. The one or more other metals are not present as the primary component of the particle in both of the first phase and the second phase, and are present at a molar ratio smaller than the molar ratio of Pd and the molar ratio of Ru. The one or more other metals are contained in the alloy fine particle of the present invention at a molar ratio of 10% or less, preferably 5% or less, more preferably 3% or less, still more preferably 1% or less, and particularly 0.5% or less. The one or more other metals are not particularly limited, but examples thereof include Rh, Ag, Au, Pt, Ir, Os, Fe, Co, Ni, Cu, Mg, Zn, Mo, W, V, Nb, Ta, Ti, Zr, Hf, Sc, Y, Cd, Hg, Cr, and Mn.

The molar ratio of Pd to Ru in the entire alloy fine particle indicated as Pd:Ru is preferably 5:95 to 95:5, 10:90 to 90:10, 10:90 to 70:30, 10:90 to 50:50, 15:85 to 45:55, 20:80 to 40:60, or 25:75 to 35:65. In a particularly preferable embodiment, the molar ratio indicated as Pd:Ru is 30:70. An alloy fine particle containing Pd and Ru at a ratio of Pd:Ru=30:70 is particularly excellent as a three-way catalyst for purifying exhaust gas. The three-way catalyst as used here indicates a catalyst having catalytic activity in the following three reactions: to reduce nitrogen oxides (NOx) into nitrogen, to oxidize carbon monoxide (CO) to form carbon dioxide, and to oxidize hydrocarbons to form water and carbon dioxide.

The alloy fine particle according to the present invention includes at least one first phase in which Pd is more abundant than Ru, and at least one second phase in which Ru is more abundant than Pd. The Pd content in the at least one first phase exceeds 50 mol %, and the Ru content in the at least one second phase exceeds 50 mol %. The first phase and the second phase are separated by a phase boundary. Because the Pd-rich first phase is separated from the Ru-rich second phase by a phase boundary, the molar ratio of Pd to Ru continually changes in the phase boundary, with the change being relatively drastic.

In this specification, "the first phase" refers to a phase in which Pd is more abundant than Ru, and the crystalline structure of the first phase is a face-centered cubic lattice (fcc). The "second phase" refers to a phase in which Ru is more abundant than Pd, and the crystalline structure of the second phase is a hexagonal close-packed lattice (hcp). In the first phase, two or more types of fcc that differ in the molar ratio of Pd to Ru and/or the direction of the crystal may be present, or only a single fcc may be present. When two or more first phases are present, the two or more first phases may be the same or different in terms of the molar ratio of Pd to Ru and/or the direction of the crystal. In the second phase, two or more types of hcp that differ in the molar ratio of Ru to Pd and/or the direction of the crystal may be present, or only a single hcp may be present. When two or more second phases are present, the two or more second phases may be the same or different in terms of the molar ratio of Ru to Pd and/or the direction of the crystal.

The "phase boundary" refers to a boundary portion between the first phase and the second phase. In the phase boundary, (1) the distribution of the molar ratio of Pd to Ru continually changes, and (2) a plurality of crystalline structures are present together. For example, two or more types of fcc that differ in the molar ratio of Pd to Ru may be present together in the first phase. However, the difference in the molar ratio of Pd to Ru, if any, is minor between the two or more types of fcc. Likewise, two or more types of hcp that differ in the molar ratio of Ru to Pd may be present together in the second phase. However, the difference in the molar ratio of Ru to Pd, if any, is minor between the two or more types of hcp.

The phrase "the molar ratio of Pd to Ru continually changes" means that increases/decreases in the Pd content and decreases/increases in the Ru content simultaneously occur in a continuous manner in the phase boundary.

Figure 7:
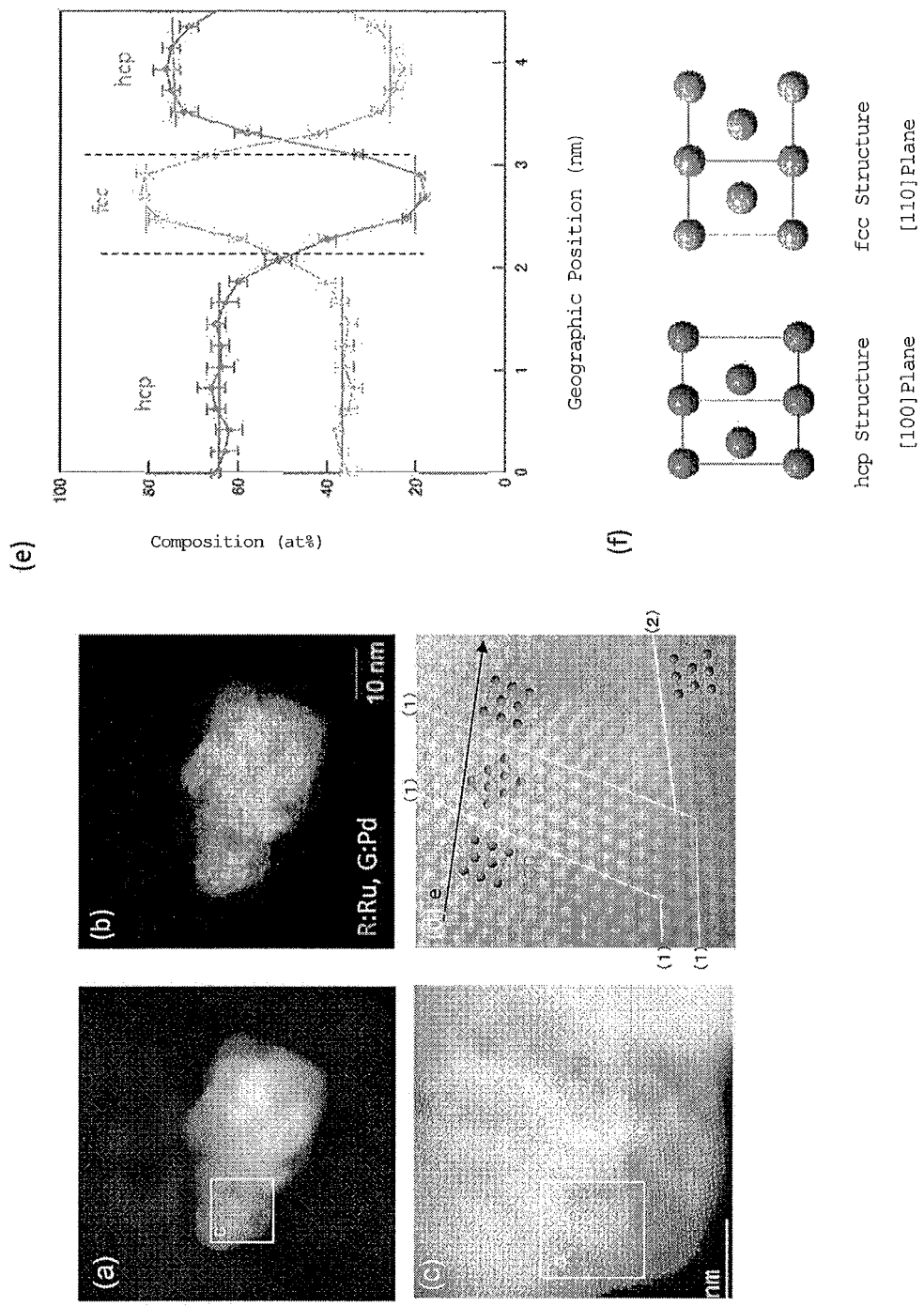
FIG. 7 shows the structure of an alloy fine particle in which Pd:Ru is 50:50 (molar ratio).
Figure 8:
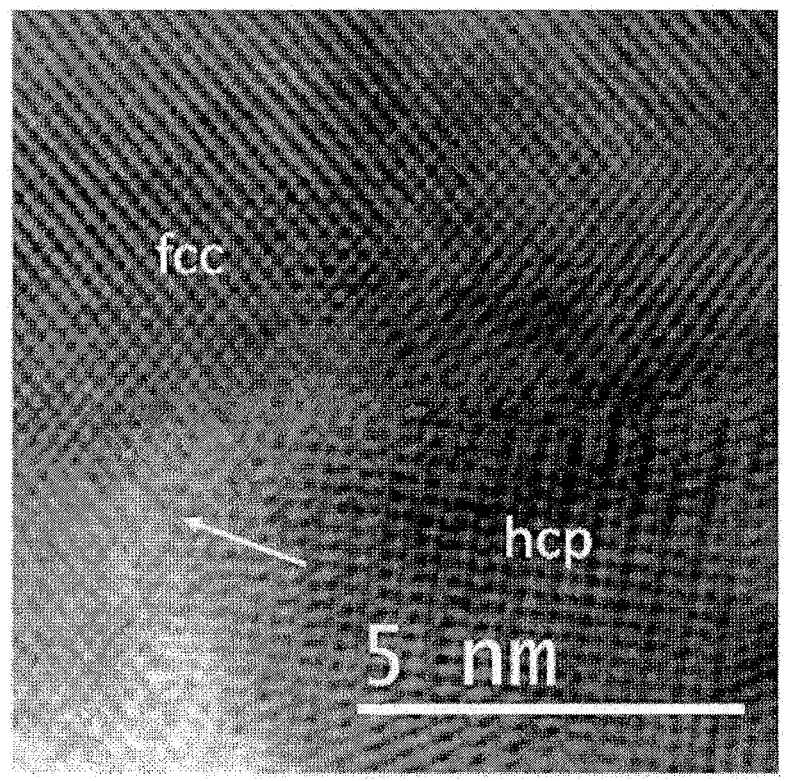
FIG. 8 is an HRSTEM image of an alloy fine particle in which Pd:Ru is 5:5, showing an incoherent interface between the fcc phase and the hcp phase. The arrow indicates an amorphous portion, which is present in the phase boundary.

FIG. 7(e) shows the molar ratios of Pd to Ru in the direction indicated by an arrow (the direction indicated by arrow e in FIG. 7(d)) in an alloy fine particle (line analysis). In the phase boundaries, the molar ratio of Pd to Ru significantly changes, and the crystalline structure changes according to the change of the primary metal. As shown in FIG. 7(d) and FIG. 7(e), the crystalline structure of the first phase in which Pd is more abundant than Ru is a face-centered cubic lattice (fcc), whereas the crystalline structure of the second phase in which Ru is more abundant than Pd is a hexagonal close-packed lattice (hcp). In both sides of the phase boundaries, changes between fcc and hcp occur. Thus, in the phase boundaries, a plurality of crystalline structures are present together. In a phase boundary, both of the fcc of the first phase and the hcp of the second phase may be present together (FIG. 7(d)), and an amorphous structure may also be present (FIG. 8). For example, although in FIG. 7(d), the fcc structure and the hcp structure are interchanged between the crystal planes of two phase boundaries (1), the phase boundaries in FIG. 7(d) are matched interfaces at which the (111) plane of fcc structure and the (001) or (0001) plane of hcp structure are in contact, with no amorphous structure being present. In the case of a high-angle grain boundary or incoherent grain boundary, the directions of the adjacent crystal grains are greatly different, and the phase boundary may contain an amorphous portion (FIG. 8). FIG. 7(d) also shows that in the second phase in which Ru is more abundant than Pd, two hcp structures that differ in the direction are separated by boundary (2). As noted, each of the first phase and the second phase may contain a single type of crystal grain, or a single phase may contain two or more types of crystal grains that differ in the direction and/or composition. In addition, when two or more first phases or two or more second phases are present, first phases or second phases that are the same in the direction of the crystal and the Pd—Ru molar ratio may be present in a single alloy fine particle, or first phases or second phases that differ in the direction of the crystal and the Pd—Ru molar ratio may be present in a single alloy fine particle. For example, FIG. 7(e) shows that two second phases (hcp) differ in the Pd—Ru molar ratio.

The phrase "a plurality of crystalline structures are present together" in a phase boundary of the alloy fine particle according to the present invention means that during the course of change of the crystalline structure from fcc of the first phase to hcp of the second phase, there exists a mix of a plurality of crystalline structures selected from fcc, fcc with crystallographic defects, hcp with crystallographic defects, and hcp. Since the molar ratio of Pd to Ru continually changes in the phase boundary, even two or more fcc structures composed of crystals that differ in the molar ratio of Pd to Ru or the direction may be present together; and two or more hcp structures composed of crystals that differ in the molar ratio of Pd to Ru or the direction may be present together. In most cases, at least one fcc (including fcc with crystallographic defects) and at least one hcp (including hcp with crystallographic defects) are present together in a phase boundary of a single alloy fine particle. When the molar ratio of Pd or the molar ratio of Ru in the entire alloy fine particle is significantly high (e.g., 80 mol % or more, 85 mol % or more, or 90 mol % or more), either fcc or hcp may be present. In this case, at least two types of fcc or at least two types of hcp that differ in the molar ratio of Pd to Ru or the direction can be present.

In the first phase and the second phase, the molar ratio of the dominant metal is 50.1 mol % or more, preferably 55 mol % or more, more preferably 58 mol % or more, and particularly 60 mol % or more, whereas the molar ratio of the subdominant metal is 49.9 mol % or less, preferably 45 mol % or less, more preferably 42 mol %, and particularly 40 mol % or less. The lower limit of the subdominant metal is 1 mol %, preferably 2 mol %, more preferably 3 mol %, still more preferably 4 mol %, particularly preferably 5 mol %, and most preferably 10 mol %.

The alloy fine particle according to the present invention has a structure similar to that created by physically dispersing Pd fine particles that have an extremely high Pd content in the first phase with Ru fine particles that have an extremely high Ru content in the second phase. However, the catalytic properties of the alloy fine particle of the present invention are superior to those of the particle obtained by physical dispersion (mechanical dispersion). Without wishing to be bound by theory, the probable reasons for this are that the first phase/second phase contains not only one metal (Pd/Ru) as the dominant component but also the other metal (Ru/Pd) as the subdominant component together, and that there is a phase boundary between the first phase and the second phase.

The alloy fine particle according to the present invention has a mean particle size of 1 nm to 120 nm, preferably 5 nm to 80 nm, and more preferably 10 nm to 60 nm. It may be difficult to produce an alloy fine particle of the present invention having a plurality of phases when the particle size is overly small. The first phase and the second phase of the alloy fine particle of the present invention each have an average size of 0.5 nm to 100 nm, preferably 1 nm to 70 nm, and more preferably 1 nm to 50 nm.

The alloy fine particle of the present invention has at least one first phase and at least one second phase.

In a preferable embodiment of the alloy fine particle according to the present invention, the molar ratio of Pd to Ru indicated by Pd:Ru in the first phase is preferably 99:1 to 51:49, more preferably 95:5 to 55:45, still more preferably 95:5 to 60:40, whereas the molar ratio of Pd to Ru indicated by Pd:Ru in the second phase is preferably 1:99 to 49:51, more preferably 5:95 to 45:55, and still more preferably 5:95 to 40:60.

Figure 9:
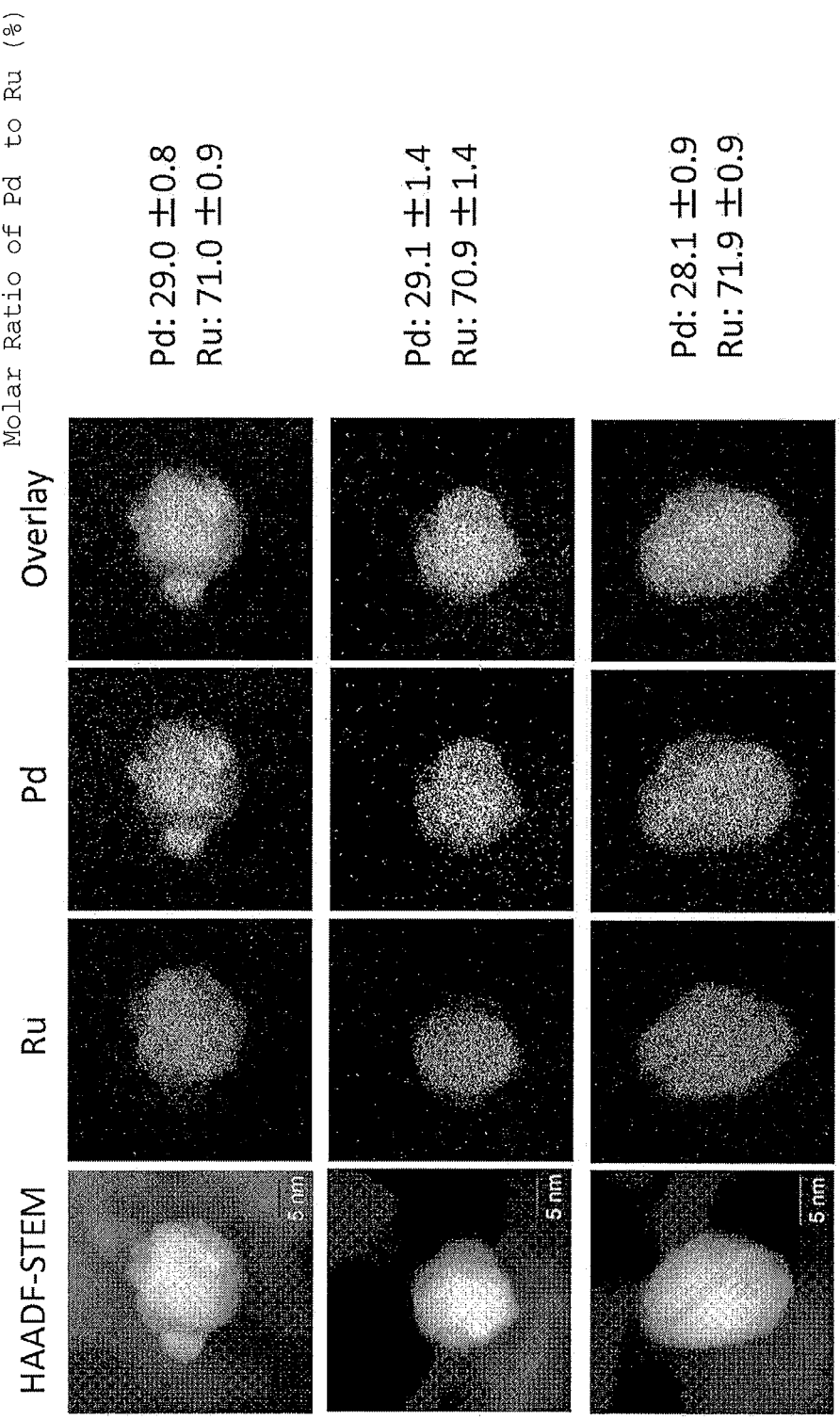
FIG. 9 shows results of STEM-EDS analysis: $Pd_3Ru_7$
Figure 10:
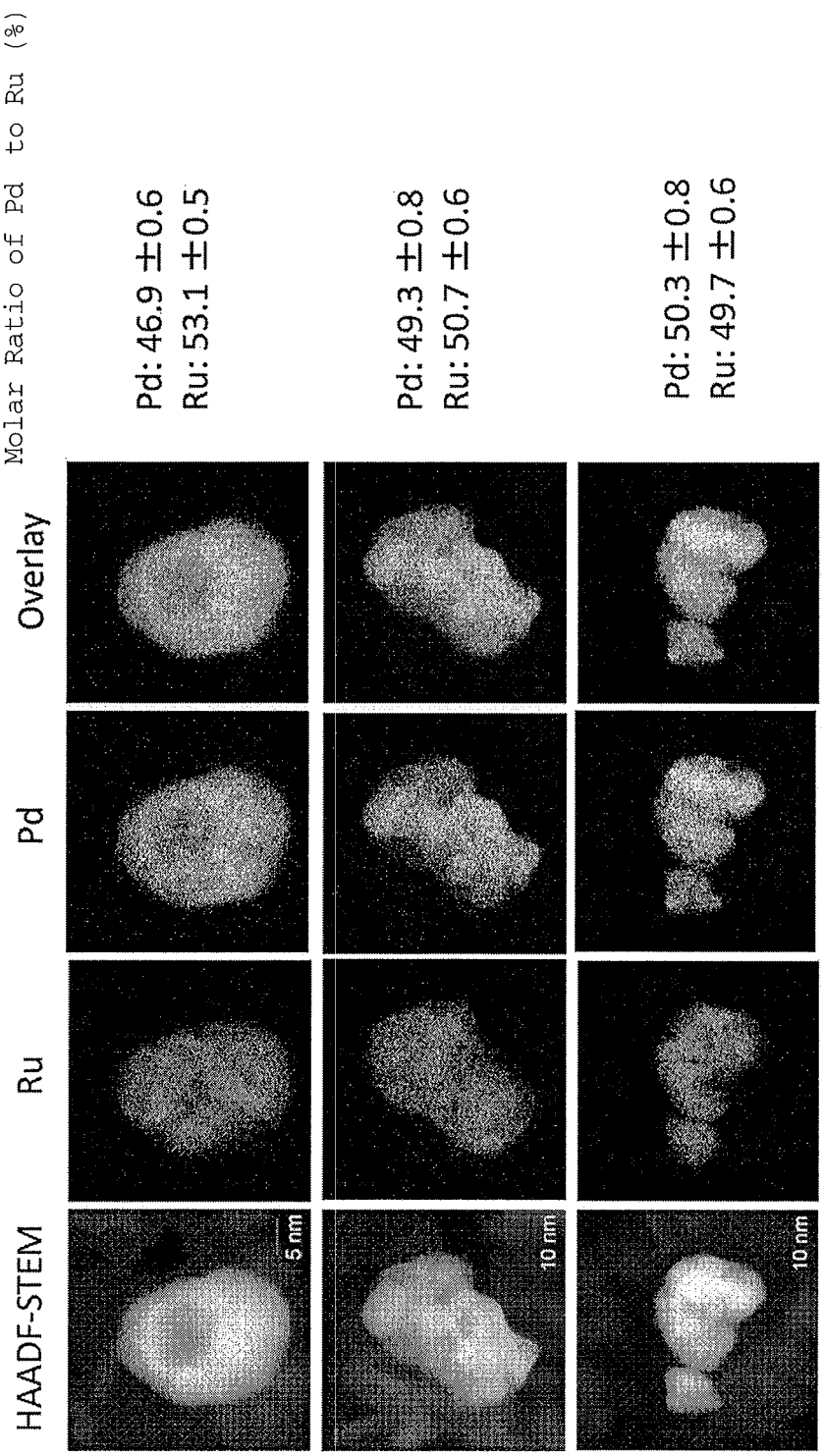
FIG. 10 shows results of STEM-EDS analysis: $Pd_5Ru_5$
Figure 11:
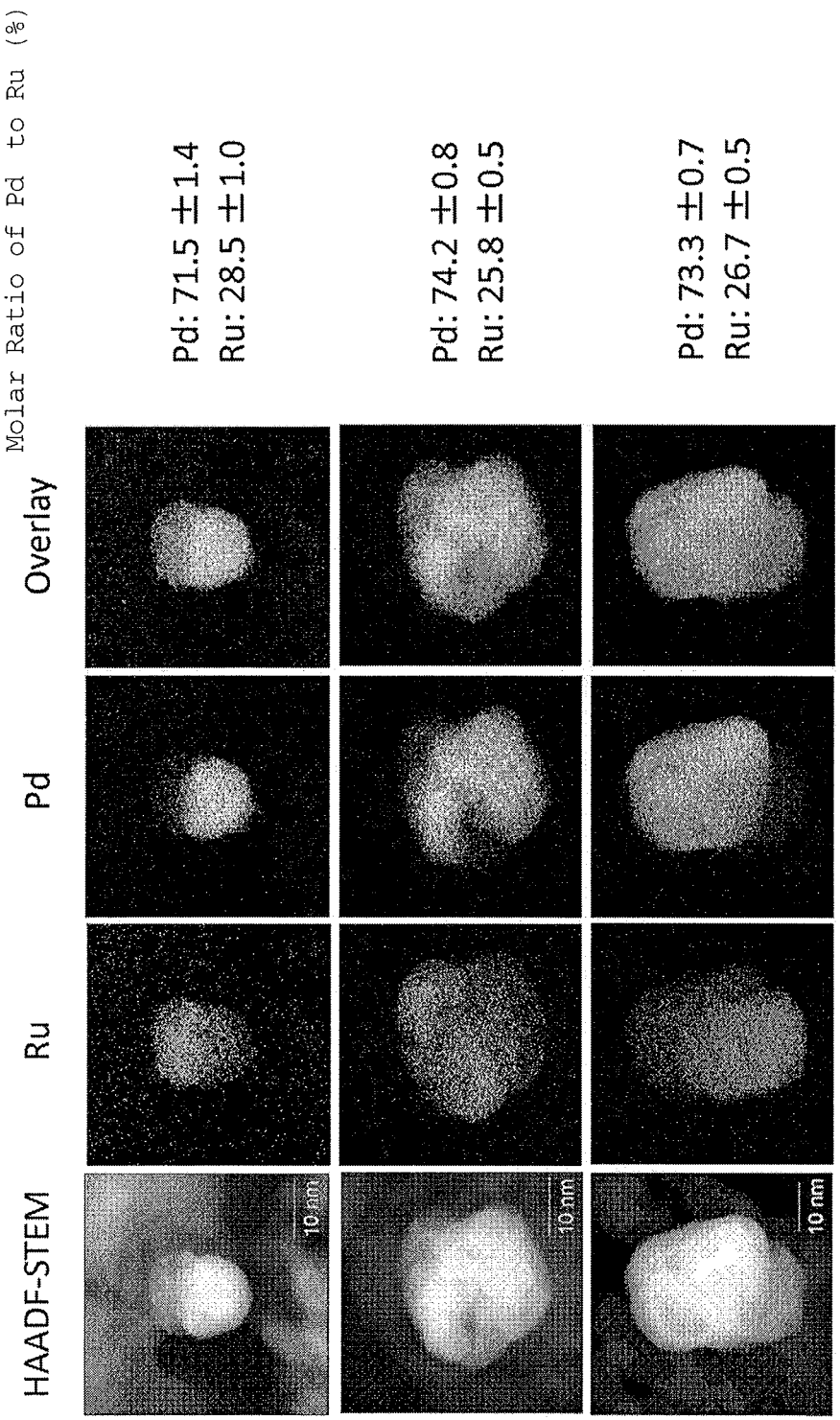
FIG. 11 shows results of STEM-EDS analysis: $Pd_7Ru_3$

In the alloy fine particle cluster according to the present invention, the first phase has a Pd-rich fcc structure, but the direction and the composition of the crystals can vary within the first phase. Likewise, in the alloy fine particle cluster, the second phase has an Ru-rich hcp structure, but the direction and the composition of the crystals can vary within the second phase. Without wishing to be bound by theory, the present inventors assume that the molar ratio in each phase is correlated with the grain size. Aside from this, the alloy fine particle cluster in which fcc structures (first phases) and hcp structures (second phases) having various Pd—Ru ratios are aggregated has substantially the same Pd—Ru molar ratio as an average between clusters (FIGS. 9 to 11). The difference in the molar ratio of Pd to Ru (variations) in the entire alloy fine particle in all of the alloy fine particles is preferably up to 5 mol %, more preferably up to 3 mol %, and still more preferably up to 1 mol %. The difference in the molar ratio of Pd to Ru (variations) between all of the alloy fine particles is determined by calculating the average. For example, in the case of FIG. 9, starting materials Pd and Ru were mixed at a molar ratio Pd:Ru of 3:7, and an alloy fine particle cluster was obtained. The data obtained in three experiments show that the molar ratio of Pd is 29.0%, 29.1%, and 28.1%, and the molar ratio of Ru is 71.0%, 70.9%, and 71.9%. The difference in the molar ratio of Pd to Ru (variations) falls within a range of up to 1 mol %. The standard deviation of the measurement values is 1.5 mol % or less.

In the case of FIG. 10, starting materials Pd and Ru were mixed at a molar ratio Pd:Ru of 5:5, and an alloy fine particle cluster was obtained. The data obtained in three experiments show that the molar ratio of Pd is 46.9%, 49.3%, and 50.3%, and the molar ratio of Ru is 53.1%, 50.7%, and 49.7%. The difference in the molar ratio of Pd to Ru (variations) falls within a range of up to 5 mol %. The standard deviation of the measurement values is 1 mol % or less.

In the case of FIG. 11, starting materials Pd and Ru were mixed at a molar ratio Pd:Ru of 7:3, and an alloy fine particle cluster was obtained. The data obtained in three experiments show that the molar ratio of Pd is 71.5%, 74.2%, and 73.3%, and the molar ratio of Ru is 28.5%, 25.8%, and 26.7%. The difference in the molar ratio of Pd to Ru (variations) falls within a range of up to 3 mol %. The standard deviation of the measurement values is 1.5 mol % or less.

The alloy fine particle or alloy fine particle cluster according to the present invention can be obtained as follows. An aqueous mixture solution containing water-soluble salts of 2 different metals and a liquid reducing agent are prepared. An aqueous mixture solution containing water-soluble salts of Pd and Ru is added to a liquid reducing agent (e.g., polyhydric alcohol, such as ethylene glycol, glycerin, diethylene glycol, and triethylene glycol), and the mixture is heated with stirring for about 1 minute to 12 hours to allow a reaction to proceed. The reaction mixture is then cooled and centrifuged to obtain alloy fine particles that contain Pd and Ru in the form of a solid solution. The reaction temperature during heating is about 100 to 300° C., for example, about 150 to 250° C. Either the liquid reducing agent or the aqueous mixture solution containing water-soluble salts of Pd and Ru, or both of them, may be heated beforehand and then mixed. These fine particles in the form of a solid solution can be prepared in accordance with the procedure disclosed in Patent Literature 1 or 2. The molar ratio of the water-soluble salt of Pd to the water-soluble salt of Ru becomes the molar ratio of Pd to Ru in the obtained alloy fine particle.

Examples of such water-soluble salts of metals include the following:
Pd: $K_2PdCl_4$, $Na_2PdCl_4$, $K_2PdBr_4$, $Na_2PdBr_4$, and palladium nitrate; and
Ru: ruthenium halides, such as $RuCl_3$ and $RuBr_3$, and ruthenium nitrate.

To obtain an alloy fine particle containing one or more other metals, a proper water-soluble salt(s) of the one or more other metals are used.

Subsequently, the fine particles in the form of a solid solution are heated at 650° C. or more, for example, 650 to 700° C., to allow Pd and Ru in the form of a solid solution to migrate within a particle, thereby forming the first phase and the second phase. The alloy fine particles according to the present invention are accordingly obtained.

Adding a carrier to the liquid reducing agent provides the metal fine particles of the present invention supported on the carrier. The alloy fine particles of the present invention supported on the carrier are suitable for use as a catalyst. Examples of carriers include, but are not limited to, silica; titania; niobia; zirconia; magnesia; alumina; complex oxides, such as titania-zirconia and alumina-silica; and metal carriers, such as metal honeycombs, including stainless steel honeycombs.

When subjecting the metal fine fine particles of the present invention that are not supported on a carrier to heat treatment at a temperature of 650° C. or more, it is preferable to heat the particles with the particles not being in contact with one another so that the particles do not bond to one another.

The alloy fine particles according to the present invention are useful as a catalyst. For example, the catalyst can be used as an exhaust gas purification catalyst, such as a three-way catalyst. Three-way catalysts, for example, reduce NOx into nitrogen, oxidize CO to form carbon dioxide, and oxidize hydrocarbons (CH) to form water and carbon dioxide.

EXAMPLES

The following describes the present invention in more detail, with reference to the Examples. However, the present invention is not limited to these Examples.

In the Examples, a JEM-ARM 200F aberration-correcting electronic microscope, produced by JEOL, was used as a measurement device for scanning transmission electron microscopic observation. The device used in the Examples was equipped with two silicon drift detectors (SDD) (drySD100GV) having a large detection area of 100 mm$^2$. Because measurement was performed using a thin beryllium holder with the detector positioned closer, the effective solid angle was 2.2 sr. Because widely available SDD detectors have an effective area of 30 mm$^2$, with an effective solid angle of 0.2-0.3 sr, the device used in the Examples had detection sensitivity 5 to 8 times that of average devices. Depending on the elements to be measured, time, and total number of counts, measurement can be made with a detection lower limit of 0.1-0.3 at % and that precision.
STEM: Scanning Transmission Electron Microscopy
HAADF-STEM: High-Angle Annular Dark Field STEM
EDS: Energy Dispersive X-Ray Spectroscopy
HRSTEM: High-Resolution STEM Example 1: Production of Alloy Fine Particles (Pd:Ru=1:9, 3:7, 5:5, 7:3, or 9:1)

An alumina powder (2 g, carrier) was added to 100 ml of triethylene glycol, and the mixture was heated at 200° C. with stirring. A solution of K$_2$PdCl$_4$ (0.1 mmol) and RuCl$_3$ (0.1 mmol) in 10 ml of ion-exchanged water was added to the heated mixture and maintained at 200° C. for 5 minutes, followed by cooling. The generated precipitates were then separated by centrifugation. The separated Pd—Ru alloy fine particles in the form of a solid solution was heated to 650° C. at a rate of 10° C./min, and then calcined for 1 minute, followed by cooling, thereby obtaining the alloy fine particles of the present invention. FIG. 1 shows the results of STEM-EDS analysis of a fine particle obtained.

The procedure above was repeated except that the metal molar ratio Pd:Ru in the solution in which K$_2$PdCl$_4$ and RuCl$_3$ were dissolved was changed to 1:9, 3:7, 7:3, or 9:1, thereby obtaining alloy fine particles having a molar ratio Pd:Ru of 1:9, 3:7, 7:3, or 9:1.

Comparative Example 1

Figure 2:
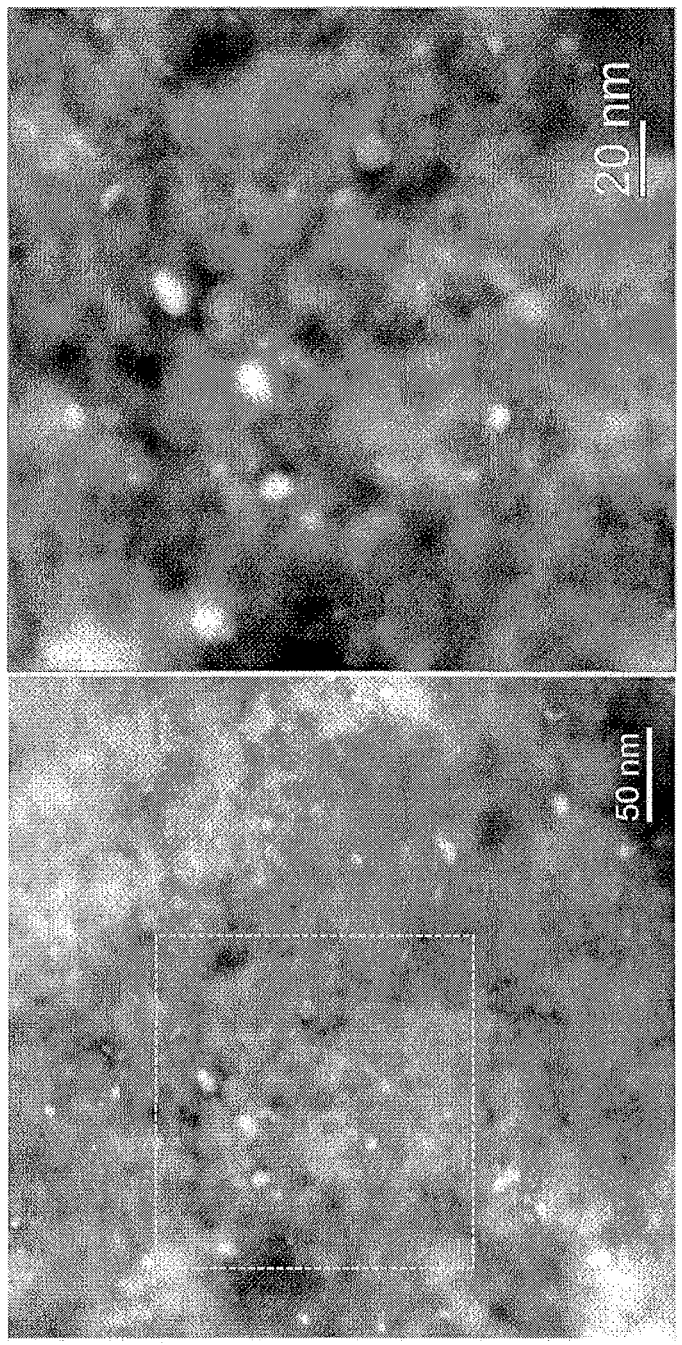
FIG. 2(A) shows data on physical dispersion (mechanical dispersion) (HAADF-STEM image).
FIG. 2(B) shows a magnified view of the square portion outlined with a dotted line in FIG. 2(A) (the stark white portion indicates Pd nanoparticles or Ru nanoparticles, with the background being an alumina carrier). Pd nanoparticles and Ru nanoparticles are relatively dispersed on a carrier (alumina), without being clumped together. The particle size distributes widely. It is difficult to identify which particles are which from the STEM images. Most of the particles are in almost no contact with one another. The particles in clear white are Pd nanoparticles or Ru nanoparticles, and the background is alumina.
Figure 3:
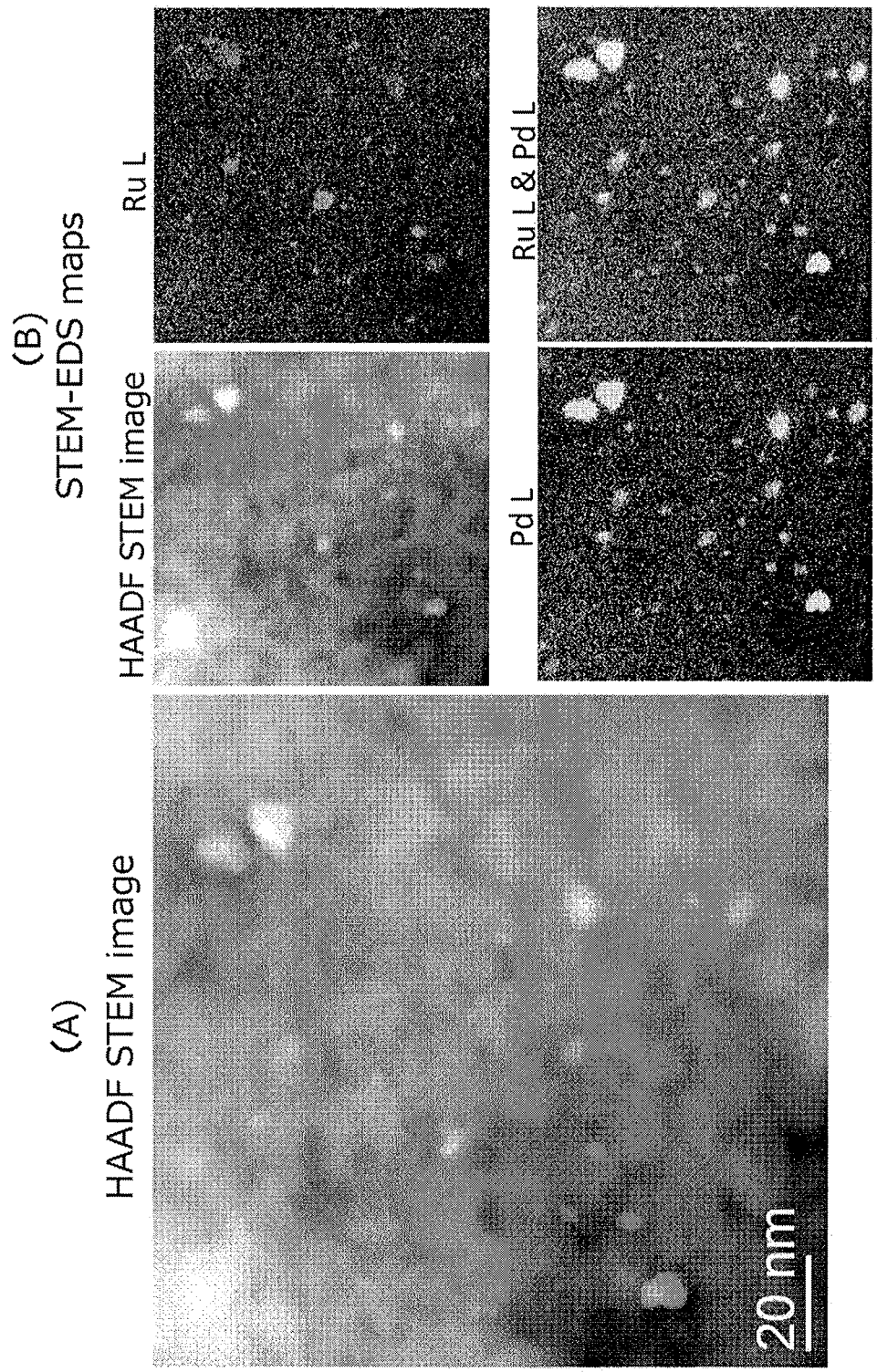
FIG. 3(A) shows data on physical dispersion (mechanical dispersion) (HAADF-STEM image).
FIG. 3(B) shows STEM-EDS maps. The Pd L is a mapping image of the distribution of Pd shown in green and brightness, expressed by characteristic X-rays emitted from electrons in the Pd L shell. The Ru L is a mapping image of the distribution of Ru shown in red and brightness, expressed by characteristic X-rays emitted from electrons in the Ru L shell. The Ru L & Pd L is a superimposed image of the Pd L mapping image and the Ru L mapping image.

Pd nanoparticles and Ru nanoparticles were physically dispersed with an alumina powder such that Pd:Ru=7:3 or 5:5, and that the ratio of Pd+Ru to the alumina powder was the same as that in Example 1. FIGS. 2 and 3 show HAADF STEM images and STEM-EDS images of the obtained physical dispersion (mechanical dispersion) of Pd and Ru with alumina. As shown in FIG. 2, Pd nanoparticles and Ru nanoparticles were relatively dispersed on the carrier, without being clumped together. The particle size was widely distributed. Although it was difficult to identify which particles were which from the STEM images, it became clear that for most of the part, Pd nanoparticles and Ru nanoparticles were almost not in contact with one another. As shown in FIG. 3, relatively large particles were Pd nanoparticles, and smaller particles were Pd or Ru nanoparticles. The average size of Pd nanoparticles appeared to be larger than that of Ru nanoparticles.

Example 2: Evaluation of Particles as Three-Way Catalyst (NOx, C$_3$H$_6$, CO)

The alloy fine particles (Pd:Ru=1:9, 3:7, 5:5, 7:3, 9:1) in Example 1 and the fine particles obtained by physical dispersion (mechanical dispersion) in Comparative Example 1 (Pd:Ru=3:7, 5:5) were used as catalysts to simultaneously evaluate the reduction reaction of nitrogen oxide (NOx), catalytic activity in oxidation of carbon monoxide (CO), and catalytic activity in oxidation of hydrocarbons (C$_3$H$_6$).

The evaluation of catalytic activity of the particles as a three-way catalyst was performed using a fixed-bed flow reactor. First, 200 mg of a pelletized catalyst was packed into a silica tubular reactor with an inner diameter of 7 mm using silica wool. This tubular reactor was connected to a device, and N$_2$-based mixed gas simulating automotive exhaust gas with a theoretical air-to-fuel ratio (NO: 993 ppm, O$_2$: 0.6%, CO: 0.6%, C$_3$H$_6$: 555 ppm, CO$_2$: 14.1%, H$_2$: 0.2%, N$_2$: balance gas) was supplied to the reactor by regulating the flow rate so as to achieve a space velocity of 60 liter/(h·gcat) (total flow rate: 200 ml/min). The temperature of the catalyst bed at the time the supply of the mixed gas was started was room temperature. While the temperature of the catalyst bed was increased from room temperature to 600° C. at a rate of 10° C./min from the start of the mixed gas supply, the concentrations of NOx, CO, and C$_3$H$_6$ contained in the collected gas were continually measured every 30 seconds with a multi-gas analyzer (Horiba, Ltd., VA-3000).

Figure 4:
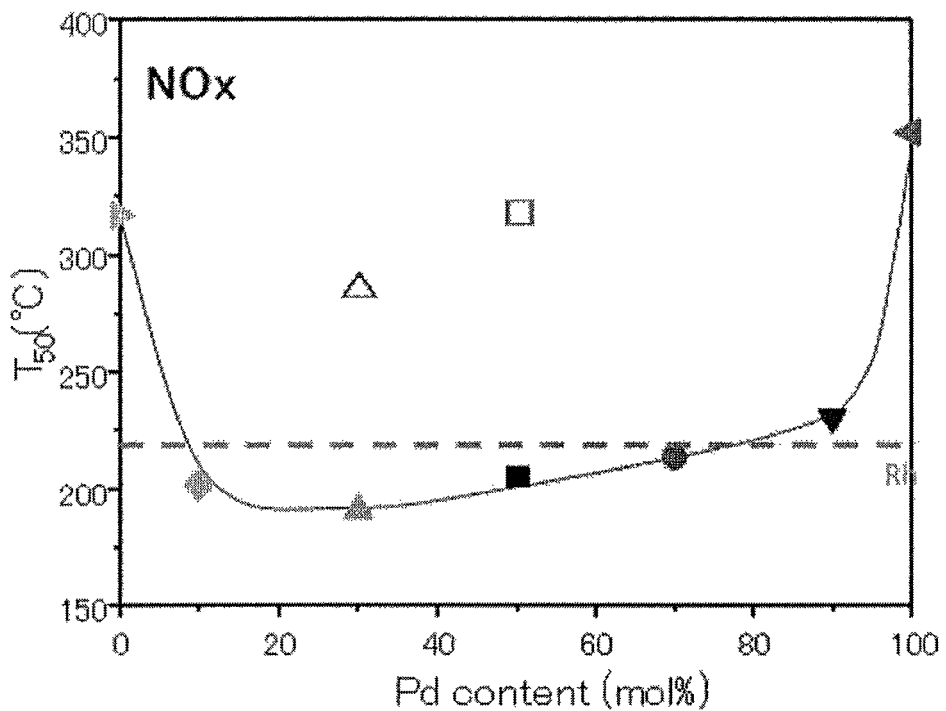
FIG. 4 shows the catalytic properties of the alloy fine particles of the present invention against NOx. $T_{50}$ indicates the temperature at which 50% of NOx is reduced to nitrogen (the temperature at which NOx conversion is 50%). The symbols Δ (Pd=30 mol %) and □ (Pd=50 mol %) each indicate physical dispersion. The alloy fine particles had a Pd content (mol %) of 0, 10 (◆), 30 (▲), 50 (■), 70 (●), 90 (▼), or 100.
Figure 5:
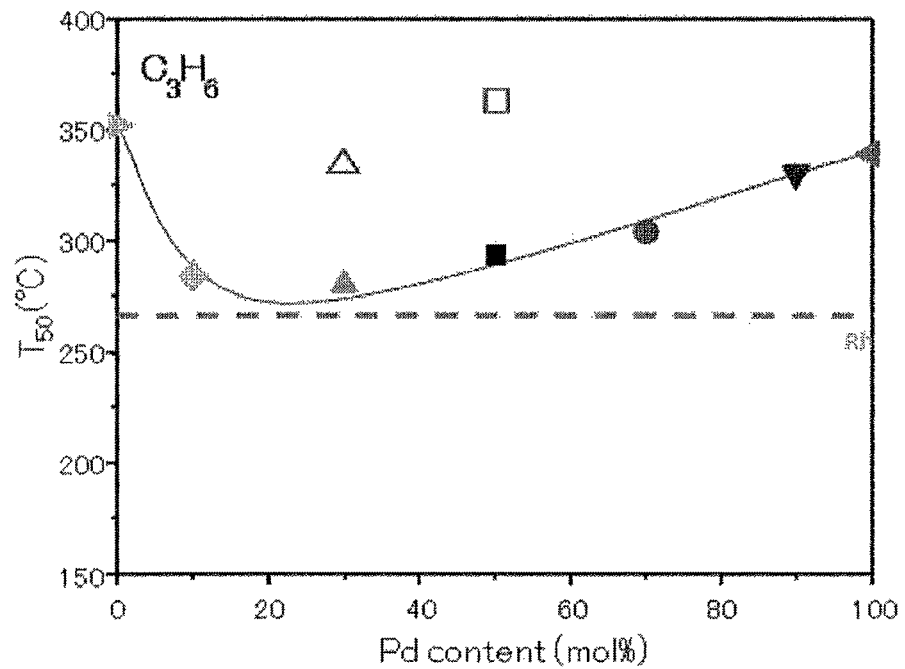
FIG. 5 shows the catalytic properties of the alloy fine particles of the present invention against a hydrocarbon ($C_3H_6$). $T_{50}$ indicates the temperature at which 50% of a hydrocarbon ($C_3H_6$) is oxidized to form water and carbon dioxide (the temperature at which $C_3H_6$ conversion is 50%). The symbols Δ (Pd=30 mol %) and □ (Pd=50 mol %) each indicate physical dispersion. The alloy fine particles had a Pd content (mol %) of 0, 10 (◆), 30 (▲), 50 (■), 70 (●), 90 (▼), or 100.
Figure 6:
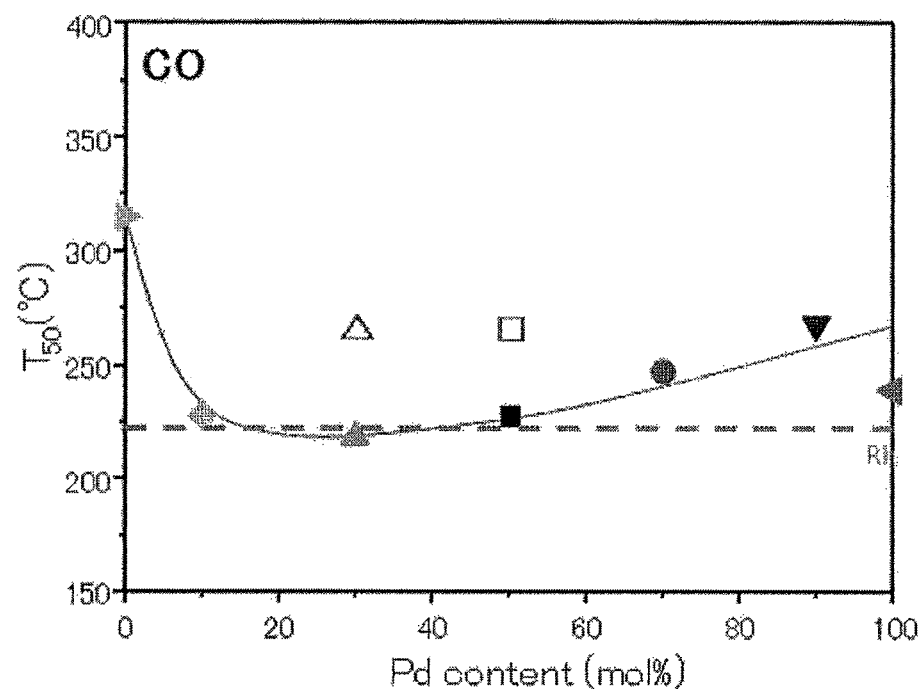
FIG. 6 shows the catalytic properties of the alloy fine particles of the present invention against CO. $T_{50}$ indicates the temperature at which 50% of carbon monoxide (CO) is oxidized to form carbon dioxide. The symbols Δ (Pd=30 mol %) and □ (Pd=50 mol %) each indicate physical dispersion. The alloy fine particles had a Pd content (mol %) of 0, 10 (◆), 30 (▲), 50 (■), 70 (●), 90 (▼), or 100.

FIGS. 4 to 6 show the results.

As is clear from FIGS. 4 to 6, the alloy fine particles of the present invention had three-way catalytic properties superior to those of the fine particles obtained by physical dispersion (mechanical dispersion).

Example 3

Alloy fine particles with a molar ratio Pd:Ru of 3:7, 5:5, or 7:3 were prepared in the same manner as in Example 1.

Elemental mapping (FIG. 7(b)), lattice image observation (FIGS. 7(c) and 7(d)), and line analysis in the direction indicated by arrow e in FIG. 7(d) (FIG. 7(e)) were performed on the obtained alloy fine particles with a molar ratio Pd:Ru of 5:5. Because the lattice images captured in FIG. 7(d) matched the models shown in FIG. 7(f) in the lattice spacing and hcp structure or fcc structure, the individual images were clearly the hcp structure on [100] plane or the fcc structure on [110] plane. Phase boundaries between the hcp structure and the fcc structure are indicated by white lines (1) in FIG. 7(d). In addition, the results of line analysis revealed that the hcp structure was Ru-rich, whereas the fcc structure was Pd-rich. As shown in FIG. 7(e), the molar ratio of Pd to Ru varied between the crystal grains.

Subsequently, 3 types of alloy fine particles supported on an alumina carrier (Pd:Ru=3:7, 5:5, 7:3) were synthesized in three rounds under the same conditions as in Example 1. The molar ratio of Pd to Ru in the obtained alloy fine particle clusters was measured by STEM-EDS analysis. FIGS. 9 to 11 show the results. In addition, HRSTEM images of the alloy fine particles with the molar ratio Pd:Ru of 3:7, 5:5, or 7:3 were captured. This revealed that as in the results shown in FIG. 7, the first phase had a Pd-rich fcc structure and the second phase had an Ru-rich hcp structure.

Example 4

Alloy fine particles with a molar ratio Pd:Ru of 5:5 were prepared in the same manner as in Example 1.

An HRSTEM image of an obtained alloy fine particle with a molar ratio Pd:Ru of 5:5 was captured (FIG. 8). This revealed that in the fine particle, there was an incoherent interface between the fcc phase and the hcp phase. The observed fcc was on a [211] plane, and the hcp was on a [100] plane, with the amorphous portion indicated by an arrow. The amorphous portion was present in the phase boundary.

INDUSTRIAL APPLICABILITY

The catalyst comprising the alloy fine particle or the alloy fine particle cluster according to the present invention is useful as a catalyst for automobile exhaust-gas purification, an electrode catalyst for domestic fuel cells, etc.

The invention claimed is:

1. An alloy fine particle comprising palladium and ruthenium, the alloy fine particle comprising at least one first phase in which the palladium is more abundant than the ruthenium and at least one second phase in which the ruthenium is more abundant than the palladium,
   the at least one first phase and the at least one second phase being separated by a phase boundary,
   the palladium and the ruthenium being distributed in the phase boundary in such a manner that the molar ratio of the palladium and the ruthenium continually changes, and
   a plurality of crystalline structures being present together in the phase boundary.

2. The alloy fine particle according to claim 1,
   wherein the at least one first phase and/or the at least one second phase comprise a plurality of crystal grains of a face-centered cubic structure (fcc) or a hexagonal close-packed structure (hcp), and
   wherein the molar ratio of the palladium to the ruthenium varies between the face-centered cubic structures (fcc) or the hexagonal close-packed structures (hcp).

3. An alloy fine particle cluster comprising a plurality of alloy fine particles, the plurality of alloy fine particles each being the alloy fine particle according to claim 2, wherein the difference (variations) in molar ratio of the palladium to the ruthenium present in the entire alloy fine particle is up to 5 mol % in all of the alloy fine particles.

4. The alloy fine particle cluster according to claim 3, wherein the difference in molar ratio of the palladium to the ruthenium present in the entire alloy fine particle is up to 3 mol % in all of the alloy fine particles.

5. The alloy fine particle cluster according to claim 3, wherein the difference in molar ratio of the palladium to the ruthenium present in the entire alloy fine particle is up to 1 mol % in all of the alloy fine particles.

6. The alloy fine particle according to claim 1, wherein the molar ratio of the palladium to the ruthenium present in the at least one first phase is 99:1 to 50.1:49.9, and the molar ratio of the palladium to the ruthenium present in the at least one second phase is 1:99 to 49.9:50.1.

7. An alloy fine particle cluster comprising a plurality of alloy fine particles, the plurality of alloy fine particles each being the alloy fine particle according to claim 6, wherein the difference (variations) in molar ratio of the palladium to the ruthenium present in the entire alloy fine particle is up to 5 mol % in all of the alloy fine particles.

8. The alloy fine particle cluster according to claim 7, wherein the difference in molar ratio of the palladium to the ruthenium present in the entire alloy fine particle is up to 3 mol % in all of the alloy fine particles.

9. The alloy fine particle cluster according to claim 7, wherein the difference in molar ratio of the palladium to the ruthenium present in the entire alloy fine particle is up to 1 mol % in all of the alloy fine particles.

10. The alloy fine particle according to claim 6, wherein the molar ratio of the palladium to the ruthenium present in the at least one first phase is 95:5 to 55:45, and the molar ratio of the palladium to the ruthenium present in the at least one second phase is 5:95 to 45:55.

11. An alloy fine particle cluster comprising a plurality of alloy fine particles, the plurality of alloy fine particles each being the alloy fine particle according to claim 10, wherein the difference (variations) in molar ratio of the palladium to the ruthenium present in the entire alloy fine particle is up to 5 mol % in all of the alloy fine particles.

12. The alloy fine particle cluster according to claim 11, wherein the difference in molar ratio of the palladium to the ruthenium present in the entire alloy fine particle is up to 3 mol % in all of the alloy fine particles.

13. The alloy fine particle cluster according to claim 11, wherein the difference in molar ratio of the palladium to the ruthenium present in the entire alloy fine particle is up to 1 mol % in all of the alloy fine particles.

14. The alloy fine particle according to claim 1, wherein the molar ratio of the palladium to the ruthenium present in the entire alloy fine particle is 10:90 to 90:10.

15. An alloy fine particle cluster comprising a plurality of alloy fine particles, the plurality of alloy fine particles each being the alloy fine particle according to claim 1, wherein the difference (variations) in molar ratio of the palladium to the ruthenium present in the entire alloy fine particle is up to 5 mol % in all of the alloy fine particles.

16. The alloy fine particle cluster according to claim 15, wherein the difference in molar ratio of the palladium to the ruthenium present in the entire alloy fine particle is up to 3 mol % in all of the alloy fine particles.

17. The alloy fine particle cluster according to claim 15, wherein the difference in molar ratio of the palladium to the ruthenium present in the entire alloy fine particle is up to 1 mol % in all of the alloy fine particles.

18. A catalyst for purifying exhaust gas comprising the alloy fine particle according to claim 1 and a carrier, wherein the alloy fine particle is supported on the carrier.

19. A method for producing the alloy fine particle according to claim 1, the method comprising
heating an aqueous solution containing a palladium salt and a ruthenium salt in the presence of a reducing agent to obtain a solid-solution alloy fine particle containing palladium and ruthenium, and
heating the particle to a temperature of 650° C. or more.

20. A method for producing a catalyst for purifying exhaust gas, the catalyst comprising the alloy fine particle containing palladium and ruthenium according to claim 1 supported on a carrier, the method comprising
heating an aqueous solution containing a palladium salt and a ruthenium salt in the presence of a reducing agent and a carrier to support a solid-solution alloy fine particle containing palladium and ruthenium on the carrier, and
heating the particle to a temperature of 650° C. or more.

* * * * *